United States Patent [19]

Rooney

[11] Patent Number: 4,968,060
[45] Date of Patent: Nov. 6, 1990

[54] SKI TRANSPORT, STORAGE, AND ANTI-THEFT DEVICE

[76] Inventor: John F. Rooney, 440 Davis Ct., Ste. 1405, San Francisco, Calif. 94111

[21] Appl. No.: 209,509

[22] Filed: Jun. 21, 1988

[51] Int. Cl.⁵ ............................................. A63C 11/00
[52] U.S. Cl. .................................. 280/814; 224/917; 280/47.32
[58] Field of Search ............ 280/814, 47.13 R, 47.32, 280/815, 63, 809; 224/917

[56] References Cited

U.S. PATENT DOCUMENTS

| | | | |
|---|---|---|---|
| 3,779,568 | 12/1973 | Wakabayashi | 280/814 |
| 3,990,655 | 11/1976 | Covell | 280/814 |
| 4,185,361 | 1/1980 | Stuart | 280/814 |
| 4,601,481 | 7/1986 | Maurice | 280/814 |

FOREIGN PATENT DOCUMENTS

| | | | |
|---|---|---|---|
| 1552202 | 11/1967 | France | 280/814 |
| 418201 | 2/1967 | Switzerland | 280/814 |
| 581487 | 11/1976 | Switzerland | 280/814 |

Primary Examiner—Charles A. Marmor
Assistant Examiner—Richard Camby
Attorney, Agent, or Firm—William C. Milks, III

[57] ABSTRACT

A device to which skis can be selectively attached for easily transporting the skis from one location to another when the skis are not in use, as well as facilitating storage and preventing theft of the skis while they are being stored. The device also preferably imprints snow for identification or other purposes when employed to transport the skis over snow.

19 Claims, 4 Drawing Sheets

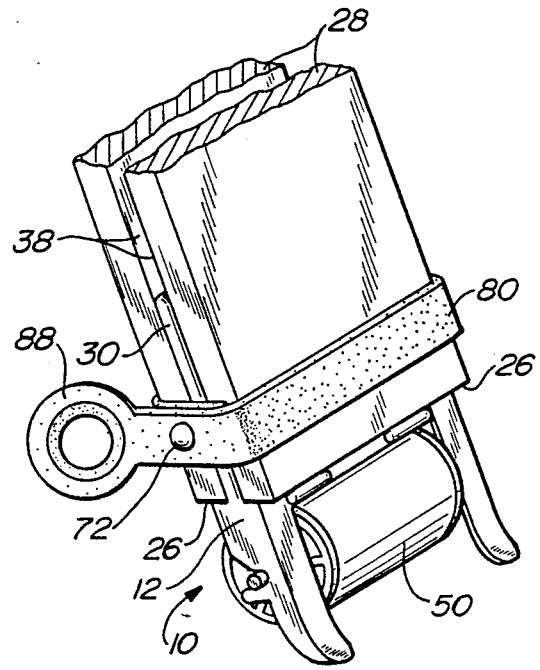
FIG._1
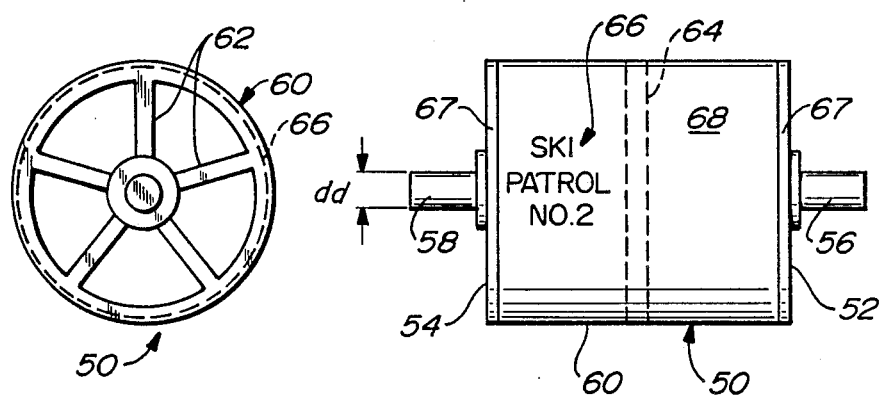
FIG._5  FIG._4

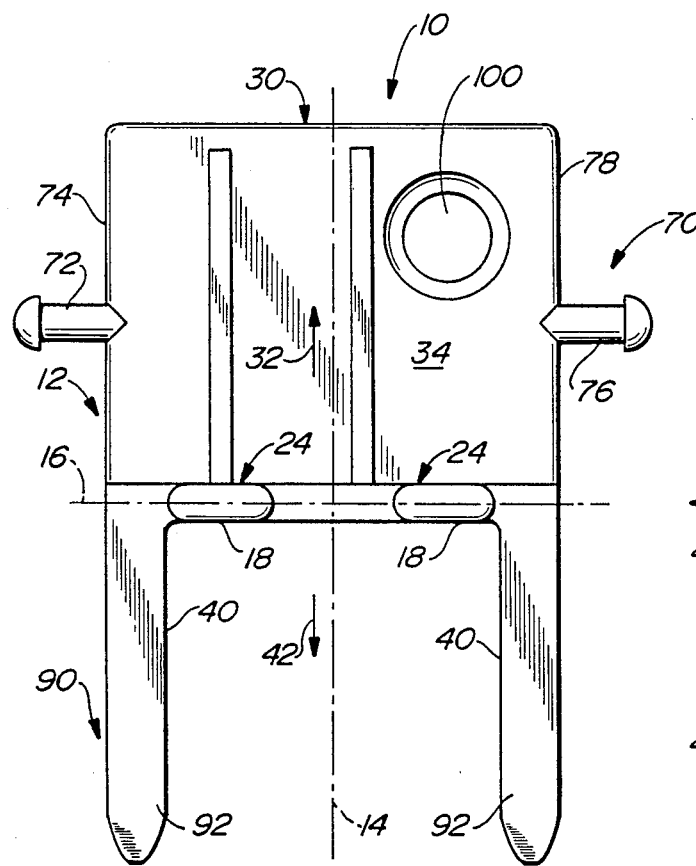
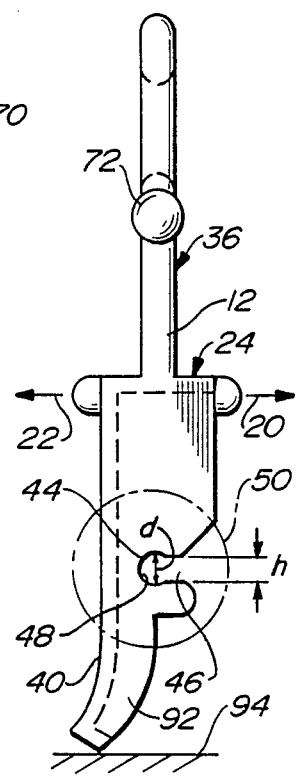
FIG._2    FIG._3

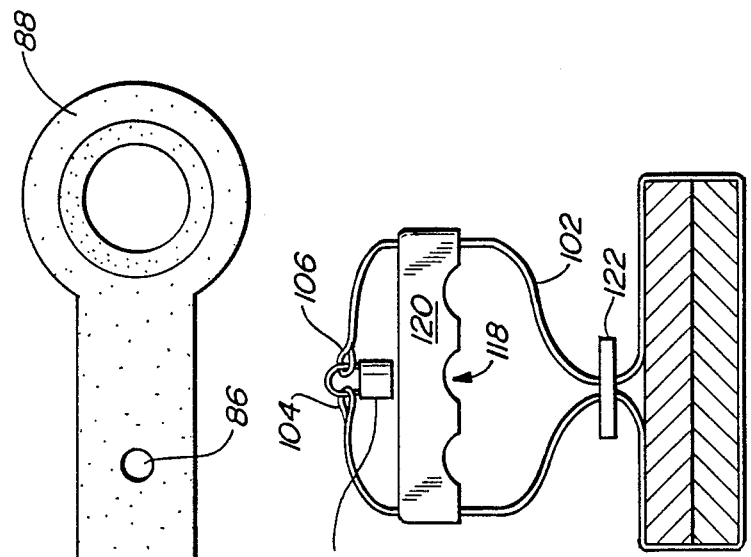
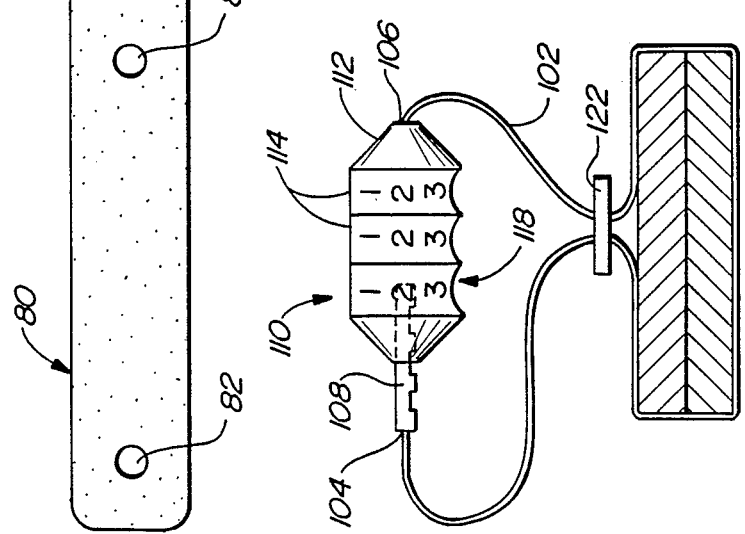

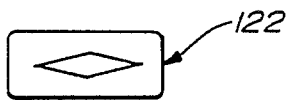
FIG._9
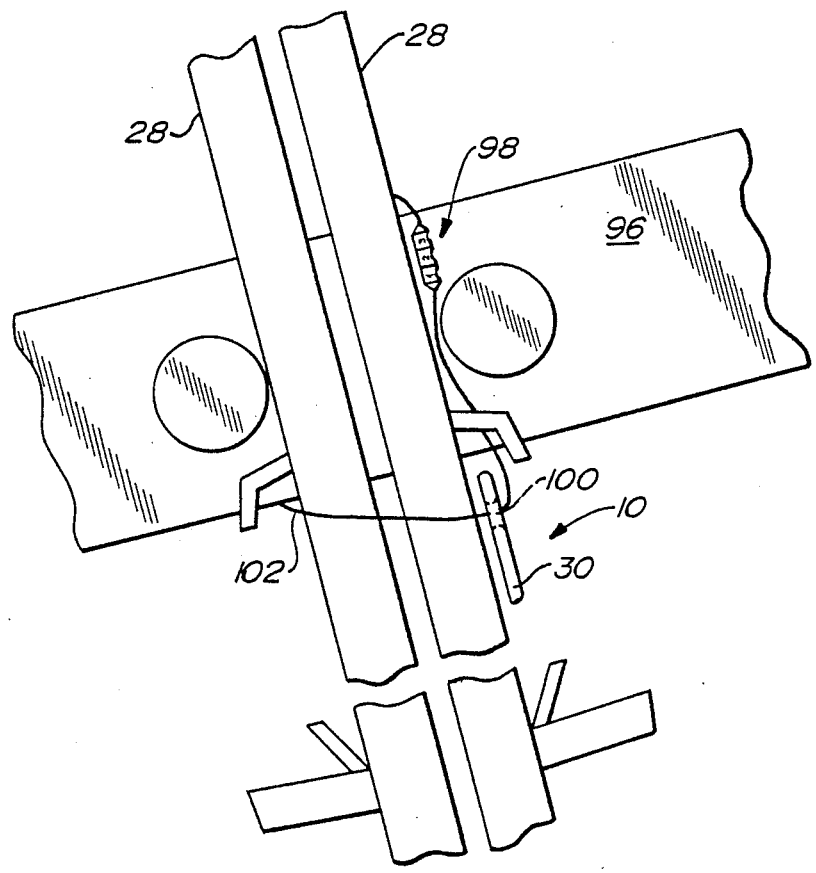
FIG._10

SKI TRANSPORT, STORAGE, AND ANTI-THEFT DEVICE

BACKGROUND OF THE INVENTION

This invention relates to ski equipment and, more particularly, to equipment for transporting, storing, and securing skis when the skis are not being used. Specifically, the invention is directed to a portable device to which skis can be selectively attached for easily transporting the skis from one location to another when the skis are not in use, as well as facilitating storage and preventing theft of the skis while they are being stored.

Various devices are known for transporting skis when they are not being used, such as when the skis are being transported to a ski resort and must be hauled through an airport, for example, or, once at the ski area, the skis must be hauled to the vicinity of the ski lift. One known device comprises a clamping mechanism having a handle. The skis are first clamped in the mechanism and then carried by the handle. One obvious disadvantage is that the full weight of the skis must be carried.

Another known device provides a wheeled mechanism to which a pair of skis can be removably attached. Such devices are shown, for example, in Wakabayashi, U.S. Pat. No. 3,779,568, Kyburz, U.S. Pat. No. 4,540,198, Markl, Swiss Patent No. 418,201, and Cornillon, French Patent No. 1,552,202. These devices overcome the disadvantage of the clamping mechanism in that the skis can be mounted on the wheeled mechanism and pulled, which relieves carrying the full weight of the skis. However, known wheeled mechanisms also have disadvantages.

The primary disadvantage of known wheeled mechanisms is that the wheel and axle assembly can become clogged with foreign material, such as dirt and sand, as the skis are being transported. This problem is particularly acute at ski areas, where pathways are often cleared through the snow exposing such foreign materials, or sand or other grit material is distributed on the snow to improve footing. When the wheel and axle assembly becomes clogged, the wheels do not turn. The skis must therefore be dragged, or they must be carried. Another disadvantage of known wheeled mechanisms is that they are not adapted to prevent the theft of skis which are left unattended.

It is therefore desirable to provide a wheeled ski transport device which does not become fouled by debris. It is also desirable to provide a wheeled ski transport device which is adapted to prevent theft of skis. Furthermore, it is desirable to provide improved means for preventing stowed skis from moving and means for imprinting the snow for identification or other purposes.

SUMMARY OF THE INVENTION

One embodiment of the present invention provides a device to which skis can be selectively attached for easily transporting the skis from one location to another when the skis are not in use, comprising: a frame having a longitudinal axis and a transverse axis, the frame comprising a plurality of arms positioned along the transverse axis of the frame and extending in opposite directions away from the transverse axis of the frame, each of the arms having a surface adapted to frictionally engage one end of each of a pair of skis placed on the frame, a flange connected to the arms and positioned along the longitudinal axis of the frame and extending in a second direction away from the transverse axis of the frame, the flange having a first surface and a second surface adapted to frictionally engage one face of each of the pair of skis placed on the frame, and a plurality of transversely separated legs extending in a third direction away from the transverse axis of the frame, each of the legs having a notch; a wheel having a first stub axle extending outwardly away from a first end of the wheel and a second stub axle extending outwardly away from a second end of the wheel, the first and second stub axles being journaled in respective notches in the legs of the frame; and means associated with the flange for removably attaching each of the pair of skis to the frame. Each of the notches in the legs preferably comprises a channel which is connected to a rounded recess, the height of the channel being less than the diameter of the recess, the first and second stub axles being inserted through respective channels into respective recesses and retained in the recesses. The device also comprises improved means for preventing the device from moving, which comprises feet connected to the legs remotely from the transverse axis and extending in the second direction beyond an exterior surface of the wheel.

In accordance with the invention, the wheel preferably has imprinting means on at least a portion of an exterior surface of the wheel for imprinting snow over which the device is pulled for identification or other purposes. Also, the device preferably comprises means for preventing theft of the pair of skis and the device when the skis are stored. The anti-theft means preferably comprises a hole in the flange and a cable having a first end and a second end, the first end of the cable being insertable through the hole in the flange and ski bindings and around a structure, such as a ski rack, and being configured as a tongue element of a cylindrical combination lock, the second end of the cable being connected to a tumbler housing of the cylindrical combination lock. When the device is in use, the cable can be cinched around the ends of the skis remote from the device, and the tumbler housing can be grasped by a user to facilitate transport of the pair of skis. The tumbler wheels on the tumbler housing are preferably concave to form handle means. Alternatively, the anti-theft means comprises a cable having a first end and a second end, the first end and the second end of the cable having respective loops, and a lock having a shackle insertable through the respective loops at the first end and the second end of the cable. A handle can also be provided so that when the device is in use, the cable can be cinched around the ends of the skis remote from the device, and the handle can be grasped by the user to facilitate transport of the pair of skis.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 1 is an isometric view of the ski transport, storage, and anti-theft device in accordance with one embodiment of the invention on which a pair of skis is shown removably mounted;

FIG. 2 is a front elevational view of the ski transport, storage, and anti-theft device shown in FIG. 1 with the wheel removed;

FIG. 3 is a side elevational view of the ski transport, storage, and anti-theft device shown in FIG. 1;

FIG. 4 is a front elevational view of one embodiment of the wheel incorporated into the ski transport, storage, and anti-theft device shown in FIG. 1;

FIG. 5 is a side elevational of the wheel shown in FIG. 4;

FIG. 6 is an elevational view of a strap incorporated into one embodiment of means for removably attaching a pair of skis to the ski transport, storage, and anti-theft device shown in FIG. 1;

FIG. 7 is an elevational view of one embodiment of combined locking and handle means incorporated into the ski transport, storage, and anti-theft device shown in FIG. 1;

FIG. 8 is an elevational view of another embodiment of combined locking and handle means incorporated into the ski transport, storage, and anti-theft device shown in FIG. 1;

FIG. 9 is a top elevational view of a slidable grip for incorporation into the combined locking and handle means shown in FIGS. 7 and 8; and FIG. 10 is a partial view of the pair of skis secured to a structure by the combined locking and handle means shown in FIG. 7.

DETAILED DESCRIPTION OF THE PREFERRED EMBODIMENTS

The present invention provides a device to which skis can be selectively attached for easily transporting the skis from one location to another, when the skis are not in use, as well as facilitating storage and preventing theft of the skis while they are being stored. The device is generally indicated by the numeral 10 in FIG. 1.

As shown in FIGS. 1 and 2, the device 10 comprises a frame 12. The frame 12 has a longitudinal axis 14 and a transverse axis 16.

The frame 12 comprises a plurality of arms 18 preferably positioned along the transverse axis 16 of the frame 12. The arms 18 extend in opposite directions 20, 22 away from the transverse axis 16 of the frame 12, as shown in FIG. 3. As shown in FIG. 2, each of the arms 18 has a surface 24 adapted to frictionally engage one end 26 of each of a pair of skis 28 placed on the frame 12, as shown in FIG. 1.

Referring again to FIG. 2, the frame 12 also comprises a flange 30 connected to the arms 18. The flange 30 is positioned along the longitudinal axis 14 of the frame 12 and extends in a first direction 32 away from the transverse axis 16 of the frame 12. The flange 30 has a first surface 34 and a second surface 36 adapted to frictionally engage one face 38 of each of the pair of skis 28 placed on the frame 12, as shown in FIG. 1. Either the first surface 34 or the second surface 36 of the flange 30, or both, can be ribbed for the purpose of strengthening the flange. For example, the first surface 34 of the flange 30 can be ribbed, as shown in FIG. 2.

Finally, the frame 12 comprises a plurality of transversely separated legs 40. The legs 40 extend in a second direction 42 away from the transverse axis 16 of the frame 12.

As shown in FIG. 3, each of the legs 40 has an open notch 44. Each of the notches 44 comprises a channel 46 which is connected to a rounded recess 48. The height h of the channel 46 is preferably less then the diameter d of the recess 48, as will be described in more detail shortly.

The device 10 also comprises a wheel 50. As shown in FIG. 4, the wheel 50 has a first end 52 and a second end 54. Preferably, the wheel 50 has a first stub axle 56 extending outwardly away from the first end 52 of the wheel. The wheel 50 also preferably has a second stub axle 58 extending outwardly away from the second end 54 of the wheel.

The wheel 50 is preferably constructed from molded plastic material and comprises a cylinder 60 having a plurality of inwardly projecting spokes 62 which extend from approximately the first end 52 of the wheel to approximately the second end 54 of the wheel interior of the cylinder 60, as shown in FIG. 5. As shown in FIG. 4, the wheel 50 is preferably strengthened by a septum 64 situated intermediate the first end 52 and the second end 54 of the cylinder 60. Preferably, the first stub axle 56 is molded integrally with the spokes 62 at the first end 52 of the wheel 50. Similarly, the second stub axle 58 is preferably molded integrally with the spokes 62 at the second end 54 of the wheel 50. The first stub axle 56 and the second stub axle 58 each have a diameter dd which is preferably greater than the height h of the channels 46 of the notches 44 and less than the diameter d of the recesses 48 of the notches so that the wheel 50 can be rotatably mounted to the frame 12, as will now be described.

The wheel 50 is rotatably mounted to the frame 12 as follows. The first stub axle 56 is aligned with the channel 46 of the notch 44 in one of the legs 40. Similarly, the second stub axle 58 is aligned with the channel 46 of the notch 44 in another of the legs 40. The first stub axle 56 and the second stub axle 58 are then pressed into the respective channels 46 of the notches 44. The rounded surfaces of the first stub axle 56 and the second stub axle 58 cam the channels 46 of the notches 44 apart so that the stub axles can be forced through the channels into the recesses 48 of the notches. The channels 46 of the notches 44 then return to the initial state and thereby retain the first stub axle 56 and the second stub axle 58 in the respective recesses 48 of the notches 44 so that the first stub axle and the second stub axle are journaled in respective notches in the legs 40 of the frame 12.

The difference between the diameter d of the recesses 48 and the diameter dd of the first stub axle 56 and the second stub axle 58 is selected to avoid being plugged by sand or other material through which the device 10 is pulled while the skis 28 are being transported. For example, the difference between the diameter d and the diameter dd can be approximately one-sixteenth inch. The channels 46 of the notches 44 also allow sand or other material to exit the recesses 48 while the device 10 is pulled. When the device 10 is pulled, rotation of the first stub axle 56 and the second stub axle 58 in the recesses 48 tends to dislodge sand or other material and feed the material to the channels 46 where the material is discharged.

One modification in accordance with the invention is to provide imprinting means 66 on at least a portion of an exterior surface 68 of the wheel 50, as shown in FIG. 4. The imprinting means 66 can comprise raised letters or numbers or other indicia for imprinting snow over which the device 10 is pulled to provide identification or for other purposes. For example, a device 10 having a unique identification embodied in the imprinting means 66 could be issued to each member of a ski patrol. Accordingly, each member of the ski patrol could use the device 10 to periodically mark the snow by transporting his or her pair of skis 28 across the snow with the skis mounted on the device 10. This would permit another member of the ski patrol to determine that one of his or her colleagues had patrolled a particular area, as well as the identity of the colleague. Also, the imprinting means 66 could be employed for promotional purposes, for example, to imprint the logo of a ski equipment manufacturer in snow. Circumferential ribs 67 having a height substantially the same as the height of the raised letters or numbers or other indicia are preferably provided on the exterior surface 68 of the wheel 50 at the first end 52 and the second end 54 of the wheel so that the wheel rolls smoothly on hard surfaces.

The device 10 further comprises means 70 for removably attaching each of the pair of skis 28 to the frame 12. Preferably, as shown in FIG. 2, the ski attaching means 70 comprises a first peg 72 connected to a first edge 74 of the flange 30 and a second peg 76 connected to a second edge 78 of the flange. The ski attaching means 70 also comprises an elastomeric strap 80 having a plurality of holes 82, 84, and 86, as well as a finger pull ring 88, as shown in FIG. 6.

When a user desires to transport the pair of skis 28 with the device 10, the pair of skis is attached to the device as follows. Initially, the user inserts one of the pegs 72 and 76 through the hole 82. Next, the user mounts one of the pair of skis 28 on the frame 12 with the end of the ski 26 abutting the arms 18 and one of the surfaces 34 and 36 of the flange 30. The user then inserts one of his or her fingers through the finger pull ring 88 and pulls the strap 80 until the other one of the pegs 72 and 76 can be inserted through the hole 84. This attaches the first of the pair of skis 28 to the device 10.

Then, the user mounts the other one of the pair of skis 28 on the frame 12 with the end of the ski 26 abutting the arms 18 and the other one of the surfaces 34 and 36 of the flange 30. The user next inserts one of his or her fingers through the finger pull ring 88 and pulls the strap 80 until the other one of the pegs 72 and 76 can be inserted through the hole 86. This attaches the other of the pair of skis 28 to the device 10, as shown in FIG. 1.

In accordance with the invention, the device 10 further comprises means 90 for preventing the device from moving when the pair of skis 28 is attached to the device and the user stores his or her skis. Preferably, the immobilizing means 90 comprises feet 92 connected to the legs 40 remotely from the transverse axis 16 and extending in the second direction 42 beyond the exterior surface 68 of the wheel 50 and any imprinting means 66 and circumferential ribs 67 on the wheel. Preferably, the feet 92 curve away from the notches 44 in the legs 40, as shown in FIG. 3.

When the user wants to stow his or her pair of skis 28 while the skis are attached to the device 10, the user simply rocks the skis so that the feet 92 contact a surface 94, such as the ground or a floor. The user then continues to rock the pair of skis 28 so that the wheel 50 is lifted from the surface 94, so that only the feet 92 contact the surface, and the skis can be leaned against a structure 96, for example, a ski rack, for storage, as shown in FIG. 10. Therefore, the device 10 and the attached pair of skis 28 are prevented from rolling on the wheel 50, since the wheel is disengaged from the surface 94.

Finally, in accordance with the invention, the device 10 preferably comprises means 98 for preventing theft of the pair of skis 28 and the device. Preferably, as shown in FIG. 10, the anti-theft means 98 comprises a hole 100 in the flange 30. The anti-theft means 98 also comprises a cable 102 having a first end 104 and a second end 106, as shown in FIG. 7. The first end 104 of the cable 102 is configured as a tongue element 108 of a cylindrical combination lock 110. The second end 106 of the cable 102 is connected to a tumbler housing 112 of the cylindrical combination lock 110. Preferably, the first end 104 of the cable 102 is inserted through the hole 100 in the flange 30. The user also threads the first end 104 of the cable 102 through bindings on each of the pair of skis 28, as well as the handles of ski poles (not shown), and around the ski rack 96, as shown in FIG. 10. The user then inserts the tongue element 108 into the tumbler housing 112 to lock his or her ski equipment, as well as the device 10, to the ski rack 96. Alternatively, the first end 104 and the second end 106 of the cable 102 can have loops, and a conventional combination or key lock 116 can be used, as shown in FIG. 8, with the shackle of the lock being inserted through the loops in the first end and the second end of the cable.

Also in accordance with the invention, the cable 102 can be utilized in combination with handle means 118 adapted to be grasped by a user to facilitate transport of the pair of skis 28. Preferably, the handle means 118 comprises concave tumbler wheels 114 on the tumbler housing 112. Alternatively, the handle means 118 comprises a handle 120 having holes through which the first end 104 and the second end 106 of the cable 102 are inserted. A slidable grip 122, as shown in FiG. 9, is also preferably included to cinch the loop formed in the cable 102 when wrapped around the pair of skis 28 at the ends of the skis remote from the device 10 during transport, as shown in FIGS. 7 and 8.

The foregoing description is offered primarily for purposes of illustration. While a variety of embodiments has been disclosed, it will be readily apparent to those skilled in the art that numerous other modifications and variations not mentioned above can still be made without departing from the spirit and scope of the invention as claimed below.

What is claimed is:

1. A device to which skis can be selectively attached for easily transporting the skis from one location to another when the skis are not in use, comprising:

a frame having a longitudinal axis and a transverse axis, the frame comprising:

a plurality of arms positioned along the transverse axis of the frame and extending in opposite directions away from the transverse axis of the frame, each of the arms having a surface adapted to frictionally engage one end of each of a pair of skis placed on the frame, respectively;

a flange connected to the arms and positioned along the longitudinal axis of the frame and extending in a second direction away from the transverse axis of the frame, the flange having a first surface and a second surface adapted to frictionally engage one face of each of the pair of skis placed on the frame, respectively; and a plurality of transversely separated legs extending in a third direction away from the transverse axis of the frame, each of the legs having a notch wherein each of the notches in the legs comprises a channel which is connected to a rounded recess, the height of the channel being less than the diameter of the recess;

a wheel having a first stub axle extending outwardly away from a first end of the wheel and a second stub axle extending outwardly away from a second end of the wheel, the first and second stub axles being journaled in respective notches in the legs of the frame, the first and second stub axles being inserted through the respective channels into the respective recesses and retained in the recesses; and means for removably attaching each of the pair of skis to the frame.

2. The device of claim 1 wherein at least one of the first surface and the second surface of the flange is ribbed for the purpose of strengthening the flange.

3. A device to which skis can be selectively attached for easily transporting the skis from one location to another when the skis are not in use, comprising:
a frame having a longitudinal axis and a transverse axis, the frame comprising:
  a plurality of arms positioned along the transverse axis of the frame and extending in opposite directions away from the transverse axis of the frame, each of the arms having a surface adapted to frictionally engage one end of each of a pair of skis placed on the frame, respectively;
  a flange connected to the arms and positioned along the longitudinal axis of the frame and extending in a second direction away from the transverse axis of the frame, the flange having a first surface and a second surface adapted to frictionally engage one face of each of the pair of skis placed on the frame, respectively; and
  a plurality of transversely separated legs extending in a third direction away from the transverse axis of the frame, each of the legs having a notch;
means for removably attaching each of the pair of skis to the frame;
a wheel having a first stub axle extending outwardly away from a first end of the wheel and a second stub axle extending outwardly away from a second end of the wheel, the first and second stub axles being journaled in respective notches in the legs of the frame; and
feet connected to the legs remotely from the transverse axis and extending in the second direction beyond an exterior surface of the wheel for preventing the device from moving when the pair of skis is attached to the device and a user stores his or her skis, whereby the device facilitates storage of the skis.

4. The device of claim 1 wherein the wheel is constructed from molded plastic material and comprises a cylinder having a plurality of inwardly projecting spokes extending from approximately the first end of the wheel to the second end of the wheel interior of the cylinder.

5. The device of claim 4 wherein the wheel is strengthened by a septum situated intermediate the first end and the second end of the cylinder.

6. The device of claim 5 wherein the first stub axle is molded integrally with the spokes at the first end of the wheel and the second stub axle is molded integrally with the spokes at the second end of the wheel.

7. The device of claim 1 wherein the first stub axle and the second stub axle each have a diameter which is preferably greater than a height of the channels of the notches and less than a diameter of the recesses of the notches so that the wheel can be rotatably mounted to the frame.

8. The device of claim 1, further comprising imprinting means on at least a portion of an exterior surface of the wheel for imprinting snow over which the device is pulled.

9. The device of claim 1 wherein the means for removably attaching each of the pair of skis to the frame comprises:
  a first peg connected to a first edge of the flange;
  a second peg connected to a second edge of the flange; and
  an elastomeric strap having a plurality of holes through which the first peg and the second peg are respectively inserted for retaining the skis on the device.

10. The device of claim 9 wherein the strap further comprises a finger pull ring for facilitating removable attachment of each of the pair of skis to the device.

11. The device of claim 1, further comprising feet connected to the legs remotely from the transverse axis and extending in the second direction beyond an exterior surface of the wheel for preventing the device from moving when the pair of skis is attached to the device and a user stores his or her skis, whereby the device facilitates storage of the skis.

12. The device of claim 11 wherein the feet curve away from the notches in the legs.

13. The device of claim 1, further comprising means for preventing theft of the pair of skis and the device while the skis are being stored, the anti-theft means comprising:
  a hole in the flange; and
  a cable having a first end and a second end, the first end of the cable being insertable through the hole in the flange and being configured as a tongue element of a cylindrical combination lock, the second end of the cable being connected to a tumbler housing of the cylindrical combination lock.

14. The device of claim 13, further comprising handle means, the handle means comprising concave tumbler wheels on the tumbler housing adapted to be grasped by a user to facilitate transport of the pair of skis.

15. The device of claim 14, further comprising a slidable grip for cinching a loop formed in the cable when wrapped around the pair of skis during transport.

16. The device of claim 1, further comprising means for preventing theft of the pair of skis and the device while the skis are being stored, the anti-theft means comprising:
  a cable having a first end and a second end, the first end and the second end of the cable having respective loops; and
  a lock having a shackle insertable through the respective loops at the first end and the second end of the cable.

17. The device of claim 16, further comprising handle means adapted to be grasped by a user to facilitate transport of the pair of skis, the handle means comprising a handle having holes through which the first end and the second end of the cable are respectively inserted.

18. The device of claim 17, further comprising a slidable grip for cinching a loop formed in the cable when wrapped around the pair of skis during transport.

19. The device of claim 3 wherein each of the notches in the legs comprises a channel which is connected to a rounded recess, the height of the channel being less than the diameter of the recess, the first and second stub axles being inserted through the respective channels into the respective recesses and retained in the recesses.

* * * * *